(12) United States Patent
Morita

(10) Patent No.: US 6,573,630 B2
(45) Date of Patent: Jun. 3, 2003

(54) ELECTROMAGNETIC ACTUATOR

(75) Inventor: Shigeki Morita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/968,488

(22) Filed: Oct. 2, 2001

(65) Prior Publication Data

US 2002/0158537 A1 Oct. 31, 2002

(30) Foreign Application Priority Data

Apr. 25, 2001 (JP) ........................................ 2001-127907

(51) Int. Cl.[7] ................................................ H02K 1/00
(52) U.S. Cl. ........................ 310/181; 310/180; 310/13
(58) Field of Search ................................ 310/181, 180, 310/51, 209, 156.01, 12–19

(56) References Cited

U.S. PATENT DOCUMENTS 4,421,997 A * 12/1983 Forys ........................... 310/12
4,972,112 A * 11/1990 Kim ............................ 310/181

FOREIGN PATENT DOCUMENTS

| JP | 7-15937 | 1/1995 |
| JP | 8-270725 | 10/1996 |

* cited by examiner

*Primary Examiner*—Thanh Lam
(74) *Attorney, Agent, or Firm*—Sughrue Mion, PLLC

(57) ABSTRACT

The present invention provides an electromagnetic actuator wherein an electromagnetic driving force for a movable component fixed to a driven member is continuously controlled by a control coil installed in a fixed component, the movable component is light weighted and a high fabricating accuracy of the actuator is not required. The electromagnetic actuator comprises a movable magnet of the movable component and a fixed magnet of the fixed component, and the control coil is installed between the first magnetic pole of the movable magnet and the first magnetic pole of the fixed magnet. And the movable magnet of the movable component is controlled by a totalized electromagnetic force wherein the totalized electromagnetic force is a sum of an electromagnetic repulsive force by the fixed magnet and an electromagnetic controlling force by the control coil of the fixed component.

15 Claims, 6 Drawing Sheets

PRIOR ART

ELECTROMAGNETIC ACTUATOR

BACKGROUND OF THE INVENTION

1. Technical Field

The present invention relates to an electromagnetic actuator and, more particularly, to a comparably small sized electromagnetic actuator using for such as automotive vehicle, for driving a reflecting mirror of a radar, for example.

2. Background Art

FIG. 8 and 9 are the schematic views showing an actuator according to a prior art. More in detail, FIG. 8 is the actuator classified as a voice coil type using a pair of the electromagnetic driving elements. Each of the electromagnetic driving elements consists of a magnet 2 installed on a bottom surface of a fixed cylindrical core 1, a bar shaped core 3 set on the magnet 2, a movable coil 4 installed in a ring shaped gap formed between the bar shaped core 3 and the cylindrical core 1 and a driven member 5 connected with the moving coil 4. The driven member 5 is installed free of rotation centering a rotating axis 7 supported by a bearing 6 and is driven by the movable coil 4.

In the actuator of the voice coil type, the driven member 5 is able to be driven in a direction of up and down by a driving force generated perpendicular to the movable coil according to a direction and a magnitude of a current through the movable coil 4. However, there are some disadvantages in using the movable coil 4 as depicted in the following. For example, a wiring 4a to the moving coil 4 is necessary, and, moreover, the moving coil 4 is needed to be light in weight for high speed operation. Accordingly, some constraints arise such as in increasing a number of turns or in enlarging a wire diameter of the movable coil 4, and so an adequate magnetic flux by the movable coil 4 is hard to be obtained. To cope with these problems, strengthening a force of the magnet 2, and reducing a magnetic resistance of the cylindrical core 1 and making the ring shaped gap smaller between the movable coil 4 and the cylindrical core 1 are inevitable for enlarging an electromagnetic driving force of the electromagnetic driving element. Resultantly, a high accuracy in fabricating the electromagnetic driving element becomes absolutely necessary.

FIG. 9 is an actuator classified as a solenoid type using a pair of the electromagnetic driving elements. Each of the electromagnetic driving elements consists of a fixed cylindrical coil 8 installed inside of the cylindrical core 1 and a movable core 9 fixed to the driven member 5, wherein the movable core 9 is installed to be attracted into the inside of the fixed coil 8. As above explained, although the actuator of the solenoid type is structurally simple, it has some weak points in a high speed control of the driven member 5 wherein a driving direction of the movable core 9 is limited to an attracting direction by the fixed coil 8, and a weight of a moving part is heavy due to the movable core 9.

SUMMARY OF THE INVENTION

In view of the above, it is the object of the present invention to provide an electromagnetic actuator wherein a driving force for a movable component fixed to a driven member is continuously controlled by a control coil fixed to a fixed component, a weight of the movable component is smaller and a high fabricating accuracy becomes is not required.

An electromagnetic actuator according to the present invention is equipped with, at least, an electromagnetic driving element for driving a driven member, said electromagnetic driving element comprises a movable component fixed to the driven member and a fixed component facing said movable component, said movable component includes a movable magnet with the first magnetic pole of the first magnetic polarity and the second magnetic pole of the second magnetic polarity, said fixed component includes a fixed magnet with the first magnetic pole of the first magnetic polarity and the second magnetic pole of the second magnetic polarity installed wherein the first magnetic pole of the fixed magnet opposes to the first magnetic pole of said movable magnet so as to give an electromagnetic repulsive force to said movable magnet, said fixed component also includes a control coil for generating an electromagnetic controlling force according to an exciting current, said control coil is installed between the first magnetic pole of said fixed magnet and the first magnetic pole of said movable magnet, wherein said movable magnet is controlled by a totalized electromagnetic force of said electromagnetic repulsive force and said electromagnetic controlling force.

According to the electromagnetic actuator, as the movable magnet of the movable component is driven by the totalized electromagnetic force of the electromagnetic repulsive force by the fixed magnet of the fixed component and the electromagnetic controlling force by the control coil of the fixed component, the totalized electromagnetic force for the movable magnet is possible to be controlled continuously by the control coil. Moreover, as the driving force is adequately obtained by increasing the number of turns and enlarging the wire diameter of the control coil which is installed to the fixed component, a cutoff in weight of the movable magnet is possibly and a high fabricating accuracy of the fixed component becomes unnecessary.

The electromagnetic actuator according to the present invention has a configuration, wherein the control coil is installed between the first magnetic pole of said fixed magnet and the first magnetic pole of said movable magnet, apart both from the first magnetic poles of said fixed magnet and said movable magnet.

According to this configuration, as the control coil is installed between the first magnetic pole of the fixed magnet and the first magnetic pole of the movable magnet apart from the first magnetic poles of both magnets, a decrease in a magnetism keeping ability of the fixed magnet due to a magnetic flux of the control coil is mitigated and the electromagnetic repulsive force can be adequately given from the fixed magnet to the movable magnet.

Furthermore, the electromagnetic actuator according to the present invention has a configuration, wherein a plate of a magnetic material is disposed on the second magnetic pole of said fixed magnet.

According to this configuration, as the second magnetic pole of the fixed magnet is installed to a plate made of a magnetic material, a magnetic coupling is strengthened both between the fixed magnet and the movable magnet and between the control coil and the movable magnet, leading to give the electromagnetic repulsive force and the electromagnetic controlling force to the movable magnet to a larger extent.

Furthermore, the electromagnetic actuator according to the present invention has a configuration, wherein the control coil is turned around a center line between the first magnetic pole of said fixed magnet and the first magnetic pole of said movable magnet.

Furthermore, the electromagnetic actuator according to the present invention has a configuration, wherein a control core is installed between the first magnetic poles of said fixed magnet and the movable magnet, and said control coil is turned around said control core.

According to these configuration, as the control coil is turned around a center line between the first poles of the fixed magnet and the movable magnet, or the control coil is turned around the control core installed between the first magnetic poles of the movable magnet and the fixed magnet, the magnetic flux by the control coil is more effectively given to the movable magnet, leading to give the electromagnetic controlling force to a larger extent.

Furthermore, the electromagnetic actuator according to the present invention has a configuration, wherein one end of said control core is installed opposing to the first magnetic pole of the movable magnet through a gap, and the other gap is formed between the opposite end of said control core and the first magnetic pole of said fixed magnet.

According to this configuration, as one end of the control core opposing to the first magnetic pole of the movable magnet through a gap and the other gap is formed between the opposite end of the control core and the first magnetic pole of the fixed magnet, an improvement in a controllability of the electromagnetic controlling force by the control coil is possible by decreasing an effect of the magnetic flux by the control coil from both the movable magnet and the fixed magnet.

Furthermore, the electromagnetic actuator according to the present invention has a configuration, wherein the electromagnetic controlling force is changed for changing the totalized electromagnetic force according to a change in a magnitude, at least, of said exciting current through said control coil.

According to this configuration, as the totalized electromagnetic force is controlled by changing, at least, the magnitude of the exciting current of the control coil, the totalized electromagnetic force is possible to be continuously controlled by changing the magnitude of the exciting current being continuously.

Furthermore, the electromagnetic actuator according to the present invention has a configuration, wherein said exciting current of said control coil is changed in its magnitude and direction for changing the electromagnetic controlling force in its magnitude and direction leading to change said totalized electromagnetic force.

Furthermore, the electromagnetic actuator according to the present invention has a configuration, wherein said totalized electromagnetic force, according to the change of the magnitude and the direction of said exciting current of said control coil, is adjusted within a range for said electromagnetic repulsive force being given from the fixed component to said movable magnet.

Furthermore, the electromagnetic actuator according to the present invention has a configuration, wherein said totalized electromagnetic force is changed according to the change of the magnitude and the direction of said exciting current of said control coil, from the state that said fixed component gives said electromagnetic repulsive force to the state that fixed component gives an electromagnetic attractive force to said movable magnet.

According to these configuration, as the totalized electromagnetic force is controlled by changing the direction and the magnitude of the exciting current, the totalized electromagnetic force is possible to be controlled continuously in a wider range by changing the direction and the magnitude of the exciting current continuously. In this case, when the totalized electromagnetic force is adjusted in a range wherein the electromagnetic repulsive force is given from the fixed component to the movable component, the totalized electromagnetic force is possible to be adjusted widely in the range. And, moreover, the totalized electromagnetic force is possible to be more widely adjusted from the state of the electromagnetic repulsive force to the state of the electromagnetic attractive force for giving from the fixed component to the movable component.

Furthermore, an electromagnetic actuator according to the present invention comprising:

a driven member installed free of sway centering a supporting point, a first electromagnetic driving element installed at one end of said driven member to the supporting point for driving said driven member, and a second electromagnetic driving element installed at the other end of said driven member to the supporting point for driving said driven member, said first electromagnetic driving element and said second electromagnetic driving element respectively includes a movable component fixed to said driven member and a fixed component opposing to its corresponding movable component, each movable component has a movable magnet with the first magnetic pole of the first magnetic polarity and the second magnetic pole of the second magnetic polarity, each fixed component has a fixed magnet with the first magnetic pole of the first magnetic polarity and the second magnetic pole of the second magnetic polarity installed wherein the first magnetic pole of the fixed magnet opposes to the first pole of its corresponding movable magnet so as to give an electromagnetic repulsive force to its corresponding movable magnet, and each fixed component also has a control coil for generating an electromagnetic controlling force according to an exciting current, said each control coil is installed between the first magnetic pole of said fixed magnet and the first magnetic pole of said movable magnet, wherein each movable magnet of said first and second electromagnetic elements is controlled by a totalized electromagnetic force of said electromagnetic repulsive force and said electromagnetic controlling force.

According to the electromagnetic actuator, the driving force for the driven member can be controlled continuously by the coils of the fixed components of the first electromagnetic element and the second electromagnetic element. Moreover the driving force for the driven member is adequately obtained by increasing the number of turns and enlarging the wire diameter of the control coils which are installed to the fixed components, then a cutoff in weight of each movable component is possibly and a high fabricating accuracy of each fixed component become unnecessary. As each control coil is installed between the first magnetic pole of the fixed magnet and the first magnetic pole of the movable magnet apart from the first magnetic poles of both magnets, a decrease in a magnetism keeping ability of the fixed magnet due to a magnetic flux of the control coil is mitigated and the electromagnetic repulsive force can be adequately given from the fixed magnet to the movable magnet.

The electromagnetic actuator according to the present invention is also configured, wherein the control coils of said first electromagnetic driving element and said second electromagnetic driving element are associatively controlled.

The electromagnetic actuator according to the present invention is also configured, wherein when said first electromagnetic driving element is controlled by its control coil to increase its electromagnetic repulsive force to its corresponding movable magnet, said second electromagnetic driving element is controlled by its control coil to decrease the electromagnetic repulsive force to its corresponding movable magnet.

The electromagnetic actuator according to the present invention is also configured, wherein when said first electromagnetic driving element is controlled by its control coil to increase its electromagnetic repulsive force to its corresponding movable magnet, said second electromagnetic driving element is controlled by its control coil so as to decrease the electromagnetic repulsive force and generate an electromagnetic attractive force to its corresponding movable magnet.

According to these configurations, in the electromagnetic actuator wherein the control coils of the first and second electromagnetic elements are associatively controlled, a direction or an angle of the driven member can be controlled based on a balance between the driving forces given by the first and second electromagnetic elements, in the electromagnetic actuator wherein when the first electromagnetic driving element is controlled by its control coil to increase its electromagnetic repulsive force to its corresponding movable magnet, the second electromagnetic driving element is controlled by its control coil to decrease the electromagnetic repulsive force to its corresponding movable magnet, a direction or an angle of the driven member can be controlled based on a balance between the electromagnetic repulsive forces given by the first and second electromagnetic elements, and in the electromagnetic actuator wherein when said first electromagnetic driving element is controlled by its control coil to increase its electromagnetic repulsive force to its corresponding movable magnet, said second electromagnetic driving element is controlled by its control coil so as to decrease the electromagnetic repulsive force and generate an electromagnetic attractive force to its corresponding movable magnet, a direction or an angle of the driven member can be controlled with more wide range based on a balance between the electromagnetic repulsive forces given by the first and second electromagnetic elements.

The electromagnetic actuator according to the present invention is also configured, wherein said control coils of the first electromagnetic driving element and the second electromagnetic driving element are independently controlled.

According to the configuration, the required driving for the driven member can be obtained by the independent control for each control coil, and an adjustment of resonant frequency in a mechanical driving system for the driven member can be obtained.

DETAILED DESCRIPTION OF THE PREFERRED EMBODIMENT

Embodiment 1

Figure 1:
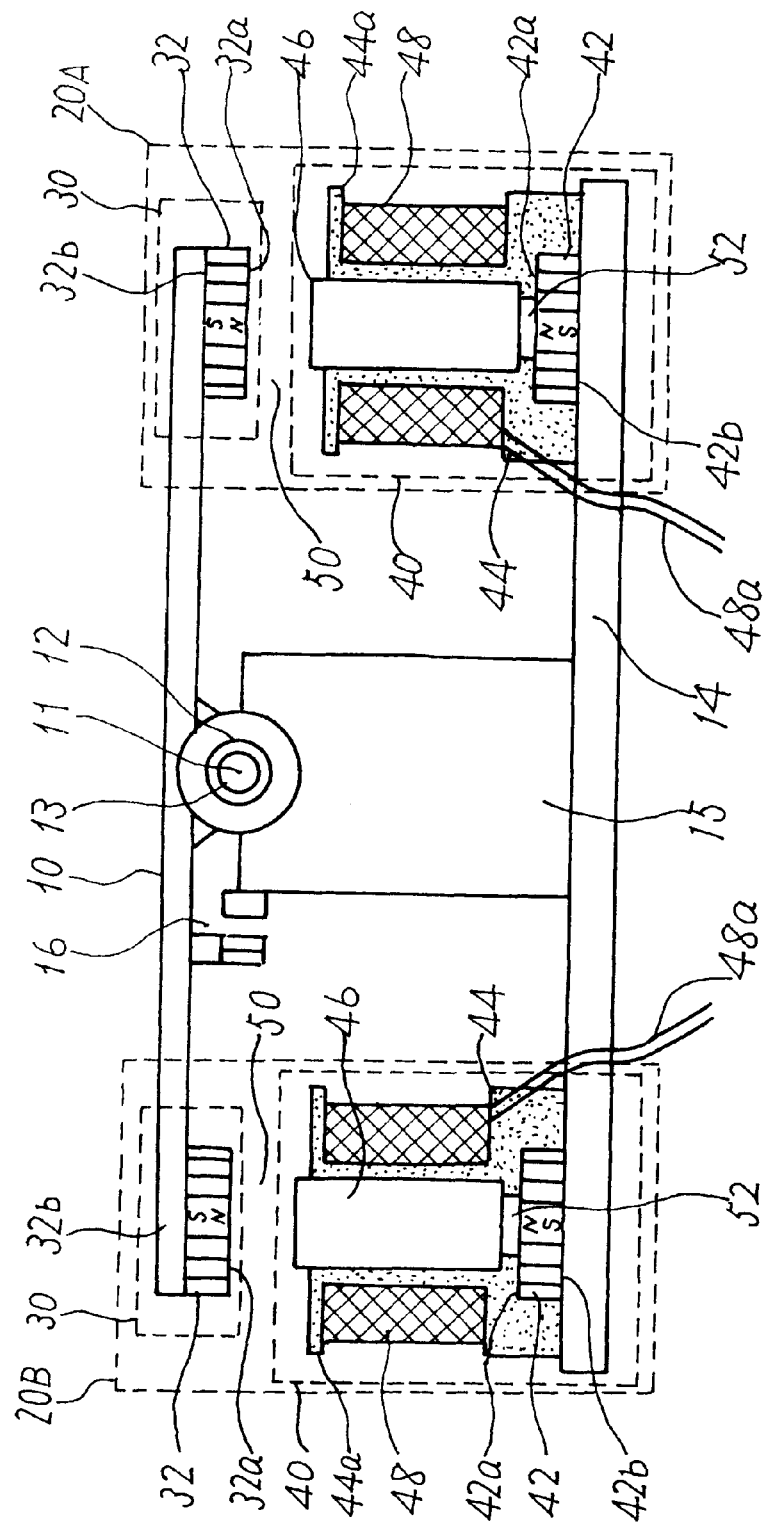
FIG. 1 is a cross section of an electromagnetic actuator in an embodiment 1 according to the present invention.

FIG. 1 is a cross section of an electromagnetic actuator in an embodiment 1 according to the present invention. The electromagnetic actuator is for driving a driven member 10, and the driven member 10 is, for example, a reflecting mirror of a radar laden in an automotive vehicle. The radar is for monitoring the environs of the automotive vehicle by detecting the obstacles from a reflected wave wherein the reflected wave is a reflection of a radio wave radiated from the radar. In this case, a light beam instead of the radio wave is usable quite in the same manner as explained above concerning the radio wave. In any case, the reflecting mirror 10 radiates the radio wave or the light beam to the environs of the automotive vehicle, and detects the obstacles around the automotive vehicle itself by receiving the reflected radio wave or the reflected light beam, wherein the reflecting mirror 10 as the driven component is controlled to change its direction or angle for changing a direction of radiating the radio wave or the light beam. The reflecting mirror 10 is supported free of sway at a supporting point 11 located around a center of weight in a central part of the reflecting mirror 10 for avoiding influence by the gravity or a turbulent vibration. The supporting point 11 is a rotating axis 13 supported free of rotation by a bearing 12, and the reflecting mirror 10 is supported free of sway centering the rotating axis 13. The bearing 12 is fixed to a support 15 installed on a plate 14. A position sensor 16 is for detecting a position of the reflecting mirror 10 and is fixed on the support 15, wherein the position sensor 16 is such as a magnetic sensor using a magnetism or a photo sensor using a light beam The electromagnetic actuator in the embodiment 1 as shown in FIG. 1 is equipped with a pair of the electromagnetic driving element 20A and 20B on a right side and a left side of the reflecting mirror 10. Namely, the first electromagnetic driving element 20A is installed on a right side of the supporting point 11 of the reflecting mirror 10 for driving a right end of the mirror, and the second electromagnetic driving element 20B is installed on a left side of the supporting point 11 for driving a left end of the mirror. Each of the electromagnetic driving element 20A and 20B has the same configuration each other, and is equipped with a movable component 30 and a fixed component 40 individually. The movable component 30 of the electromagnetic driving element 20A and 20B is equipped with a movable magnet 32 fixed to the reflecting mirror 10. The movable magnet 32 is a cylindrical shaped magnet having the first magnetic pole 32a magnetized as a N pole and the second magnetic pole 32b magnetized as a S pole, wherein the second magnetic pole 32b (S pole) and the reflecting mirror 10 are united fixedly. Here, it is, of course, possible to replace the 2nd magnetic pole 32b (S pole) by the 1st magnetic pole 32a (N pole) in the above configuration to have an equivalent effect.

The fixed component 40 of the electromagnetic driving element 20A and 20B is installed face to face to the movable component 30. The fixed component 40 is fixed to a right and a left side of the plate 14 on which the support 15 is installed. The plate 14 is made of a magnetic material such as an iron plate. First of all, the fixed component 40 includes the fixed magnet 42, wherein the fixed magnet 42 is cylindrically manufactured like the movable magnet 32 and has the first magnetic pole 42a magnetized as a N pole and the second magnetic pole 42b magnetized as a S pole. The fixed magnet 42 of the electromagnetic driving element 20A and 20B is installed face to face to the movable magnet 32 of the electromagnetic driving element 20A and 20B. The second magnetic pole 42b (S pole) and the plate 14 are united fixedly, and, consequently, the first magnetic pole 42a (N pole) of the fixed magnet 42 faces the first magnetic pole 32a (N pole) of the movable magnet 32. Here, when a configuration is modified wherein the first magnetic pole 32a of the movable magnet 32 and the reflecting mirror 10 are united fixedly, the first magnetic pole 42a of the fixed magnet and the plate 14 are united fixedly for obtaining the same effect as explained above.

The fixed component 40 of the electromagnetic driving element 20A and 20B consists of a bobbin 44 made of a resin, a control core 46 and a control coil 48. The bobbin 44 is installed covering the fixed magnet 42, and the control core 46 is held on the side magnet 42. The control core 46 is a bar type iron core with a circular cross section, and is installed between the first magnetic pole 32a (N pole) of the movable magnet 32 and the first magnetic pole 42a (N pole) of the fixed magnet 42. An upper end of the control core 46 faces the first magnetic pole 32a (N pole) of the movable magnet 32 across a gap 50, and also a gap 52 is formed between a lower end of the control core 46 and the first magnetic pole 42a (N pole) of the fixed magnet 42. The bobbin 44 has a winding frame 44a in its outer peripheral wherein each of the control coil 48 is wound around the winding frame 44a. Resultantly, the control coil 48 is wound around a center line connecting the first magnetic pole 32a of the movable magnet 32 with the first magnetic pole 42a of the fixed magnet 42, and a magnetic flux is generated along the center line. Furthermore, a wire 48a is a connecting wire for the control coil 48 whereby the control coil 48 is connected to an exciting circuit.

The fixed component 40 of the electromagnetic driving element 20A and 20B generates a totalized electromagnetic force F0 of the first and the second electromagnetic force F1 and F2 to the movable component 30. The first electromagnetic force F1 is given from the fixed magnet 42 to the movable magnet 32. As the first magnetic pole 42a (N pole) of the fixed magnet 42 faces the first magnetic pole 32a (N pole) of the movable magnet 32, the first electromagnetic force F1 which is given from the fixed magnet 42 to the movable magnet 32 is an electromagnetic repulsive force working to keep the movable component 30 from the fixed component 40. And the electromagnetic repulsive force always becomes roughly constant because these magnet 32 and 42 are permanent magnets.

The second electromagnetic force F2 is given from the fixed component 40 to the movable component 30, and is generated by the control coil 48. The control coil 48 generates a magnetic flux along a line connecting the first magnetic pole 32a of the movable magnet 32 with the first magnetic pole 42a of the fixed magnet 42. And the electromagnetic force F2 in its direction and magnitude given to the movable component is controlled based on the magnetic flux generated in proportion to a direction and a magnitude of an exciting current of the control coil 48. When the exciting current flows in each of the control coils 48 in a certain direction, the electromagnetic force F2 by the control coil 48 is given to the movable component 30 in the same direction with that of the fixed magnet 42, namely, the direction to detract the movable component 30 from the fixed component 40, and the magnitude of the force is proportional to the magnitude of the exciting current. When the exciting current is reversed in its direction, the electromagnetic force F2 by the control coil 48 as opposed to the repulsive force works in the direction to attract the movable component 30 toward the fixed component 40 wherein the magnitude of the force is proportional to the exciting current.

If a repulsive direction of the first electromagnetic force F1 by the fixed magnet 42 is assumed to be a positive polarity, the totalized electromagnetic force F0 becomes F0=F1±F2, and, therefore, the totalized electromagnetic force F0 can be controlled widely by changing the direction and the magnitude of the exciting current. A direction and an angle of the reflecting mirror 10 are controlled based on a balance between the totalized electromagnetic forces F0 of the electromagnetic driving element 20A and 20B.

In the embodiment 1 according to the present invention, there are no specific limitations in enlarging the magnetic flux of the control coil 48 by increasing the number of turns of the coil due to a configuration wherein the control coil 48 is installed in the fixed component 40. The same can be said in enlarging the magnetic flux by increasing a wire diameter of the control coil 48 to obtain an enough exciting current. Therefore, the second electromagnetic force F2 with an enough strength is obtainable by increasing the number of turns and the wire diameter of the control coil 48. Moreover, as the control core 46 effective for strengthening the electromagnetic force by the control coil 48 is installed in the fixed component 40, the core does not cause a weight increase in the moving component 30, and the moving component 30 can be as light as possible in its weight for realizing a high speed driving.

It is also an important point wherein the control coil 48 is installed between the first magnetic pole 32a of the movable magnet 32 and the first magnetic pole 42a of the fixed magnet 42. Namely, as the control coil 48 is installed between the magnetic pole 32a and 42a, the required gaps can be secured between the control coils 48 and the first magnetic pole 32a as well as between the control coil 48 and the first magnetic pole 42a respectively. Based on these gaps, the magnetic flux by the control coil 48 is, at least, partly able to bypass both the movable magnet 32 and the fixed magnet 42. Consequently, even when a flow of the magnetic flux by the control coil 48 is contrary to that by the movable magnet 32 and the fixed magnet 42, a decrease in a magnetism keeping ability of the magnet 32 and 42 is mitigated. Therefore, the required electromagnetic force is given from the fixed component 40 to the movable component 30 more accurately, and the driven component 10 is driven more precisely.

Furthermore, both the gap 50 formed between the control core 46 and the movable magnet 32 and the gap 52 formed between the control core 46 and the fixed magnet 42 are effective for raising a controllability by the control coil 48. The gap 50 and 52 are useful for the control coil 48 wherein the magnetic flux of the control coil 48 is made less influenced by both the magnetic flux of the movable magnet 32 and the fixed magnet 42. Also, a change of the magnetic flux by the control coil 48 is enlarged and a controlling ability by the exciting current of the control coil 48 is promoted. The plate 14 made of a magnetic plate is united with the second magnetic pole 42b of the fixed magnet 42, and functions as a magnetic pole plate. Furthermore, the plate 14 extends the magnetic flux of the second magnetic pole 42b and the control coil 48 to the environs of the 2nd magnetic pole 42b, and strengthens a magnetic coupling between the fixed magnet 42 and the movable magnet 32 and between the control coil 48 and the movable magnet 32, leading to enlarge the electromagnetic force to the movable component 30.

Figure 2:
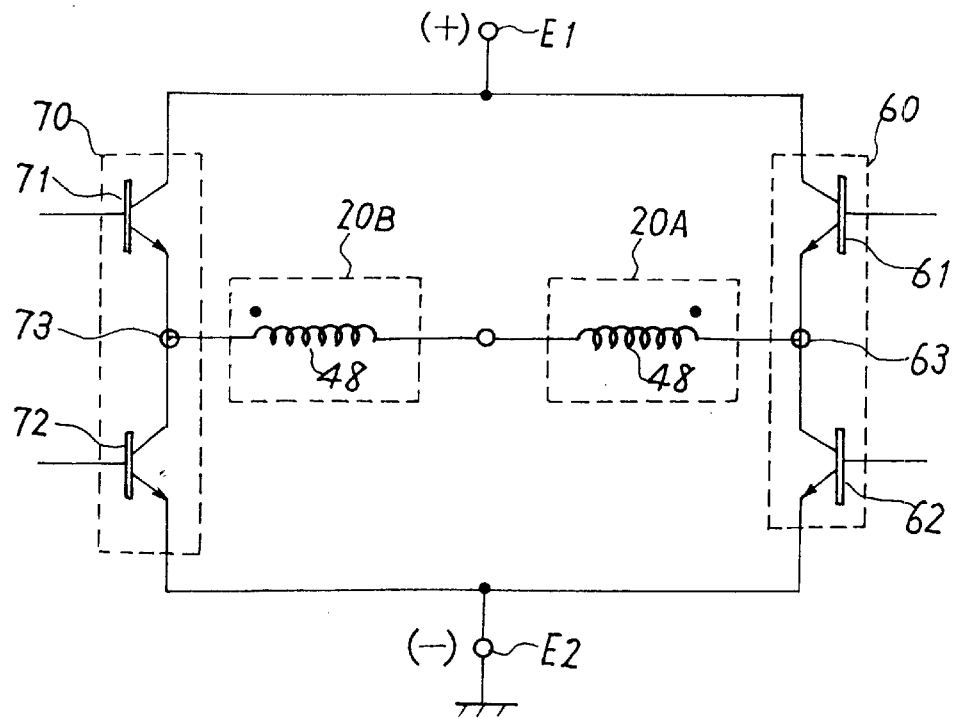
FIG. 2 is an exciting circuit diagram of the electromagnetic actuator in the embodiment 1 according to the present invention.

FIG. 2 shows an exciting current circuit for each control coil 48 of the electromagnetic element 20A and 20B. The exciting current circuit has a pair of a switching circuit 60 and 70, and the switching circuit 60 and 70 are respectively connected between a positive terminal E1 and a negative terminal E2 wherein the negative terminal E2 is an earth potential. The switching circuit 60 includes a pair of a switching element 61 and 62, wherein the NPN type power transistors, for example, are used for the switching element 61 and 62. A collector of the switching element 61 is connected to the positive terminal E1, and its emitter is connected to an output terminal 63 of the switching circuit 60. A collector and an emitter of the switching element 62 are respectively connected to the output terminal 63 and the negative terminal E2. The switching circuit 70 includes a pair of a switching element 71 and 72 composed respectively of a NPN type power transistor. A collector and an emitter of the switching element 71 are respectively connected to the positive terminal E1 and an output terminal 73 of the switching circuit 70. A collector and an emitter of the switching element 72 are respectively connected to the output terminal 73 and the negative terminal E2 of the switching circuit 70. In this case, a power FET (field effect transistor) is usable as the switching element 61,62,71 and 72.

The control coil 48 of the electromagnetic driving element 20A and 20B is connected serially for being controlled associatively between the output terminal 63 of the switching circuit 60 and the output terminal 73 of the switching circuit 70. In the first state wherein the switching element 62 and 71 are OFF, and the switching element 61 and 72 are ON, the exciting current flows from the output terminal 63 to the output terminal 73 serially through each of the control coils 48. Contrary to this, in the second state wherein the switching element 61 and 72 are OFF, and the switching element 62 and 71 are ON, the exciting current flows from the output terminal 73 to the output terminal 63 serially through each of the control coils 48. A characteristic of an exciting polarity of the control coil 48 with the positive pole shown dotted is in a reverse direction mutually. Therefore, when one of the control coils 48, for example, of the electromagnetic driving element 20A gives a repulsive force (+F2) of the same polarity with that of the fixed magnet 42 to the movable component 30 based on the exciting current through the serially connected control coils 48, the other of the control coils 48 of the electromagnetic driving element 20B gives an attractive force (−F2) of the opposite polarity to that of the fixed magnet 42 to the movable component 30. In this case, the totalized electromagnetic force becomes F0=F1+F2 for the electromagnetic driving element 20A and F0=F1−F2 for the electromagnetic driving element 20B.

In an adjusting mode of the control coil 48 wherein the electromagnetic force F2 by the control coil 48 is adjusted in a range smaller than the electromagnetic force F1, the electromagnetic driving element 20A and 20B are adjusted wherein the repulsive force of each driving element is mutually opposite in its direction in a range wherein the repulsive force is given to the movable component 30 of the driving element. For example, when the totalized electromagnetic force, F0=F1+F2, of the electromagnetic driving element 20A increases the repulsive force F1 by the fixed magnet 42 in the 1st state wherein the switching element 61 and 72 are ON, the totalized electromagnetic force, F0=F1−F2, of the electromagnetic driving element 20B is adjusted wherein the repulsive force F1 from the fixed magnet 42 to the movable component 30 is decreased. In the electromagnetic actuator shown in FIG. 1, the reflection mirror 10 is moved around the rotating axis 13 counterclockwise when the repulsive force by the electromagnetic driving element 20A is increased and the repulsive force of the electromagnetic driving element 20B is decreased. In the second state wherein the switching element 62 and 71 are ON, the reflecting mirror 10 is moved clockwise by a reverse adjustment. In any case, the direction or the angle of the reflecting mirror 10 is controlled based on a balance between the totalized electromagnetic forces of the electromagnetic driving element 20A and 20B.

It is also possible to adopt the adjusting mode wherein the electromagnetic force F2 by the control coil 48 is adjusted in a range larger than the electromagnetic force F1. In the first state of the adjusting mode, for example, wherein the switching element 61 and 72 are ON, when the totalized electromagnetic force F0 of the electromagnetic driving element 20A is adjusted to be larger than twice of the repulsive force F1 by the fixed magnet 42, the totalized electromagnetic force of the electromagnetic driving element 20B becomes the attractive force opposed to the repulsive force F1 by the fixed magnet 42, and the reflecting mirror 10 is moved counterclockwise in a larger extent. Similarly, in the second state wherein the switching element 62 and 71 are ON, the reverse adjustment is made and the reflection mirror 10 is moved clockwise to a large extent.

The magnitude of the exciting current through the control coil 48 of the electromagnetic driving element 20A and 20B is, for example, adjusted by changing an ON time ratio of the switching element. For example, in the first state wherein the switching element 61 and 72 become ON, when a time ratio of the switching element 61 and 72 being ON in an unit time is changed, the exciting current with the magnitude according to the time ratio is supplied to each of the control coil 48. Similarly, the magnitude of the exciting current of the control coil 48 is adjusted in the second state wherein the switching element 62 and 71 become ON as in the first state mentioned above. Adjusting the ON time ratio is executed by changing a driving pulse width applied to a base of each switching element.

The electromagnetic actuator in the embodiment 1, as heretofore explained, controls the angle of the reflecting mirror 10 by balancing the exciting current of the control coil 48 of the electromagnetic driving element 20A and 20B. Furthermore, the control of the reflecting mirror 10 is basically an open loop control. However, when a high speed driving of the actuator is required, the control is executed as a feedback control for controlling the control coil 48 based on a signal from the position sensor 16. The feedback control is done by controlling a base driving current of the switching element 61, 62, 71 and 72.

Embodiment 2

Figure 3:
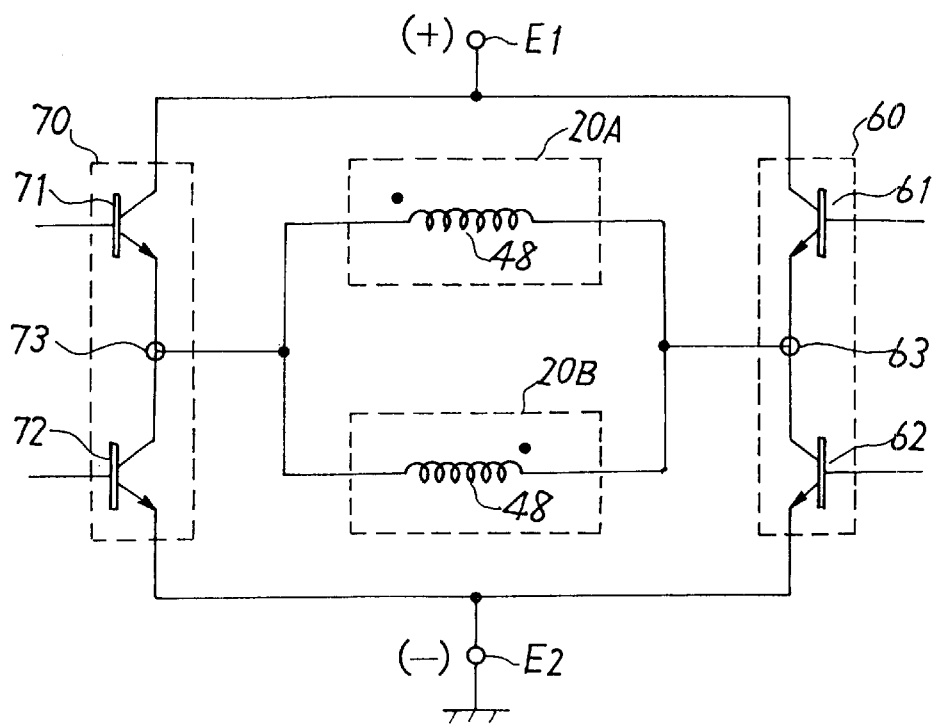
FIG. 3 is an exciting circuit diagram of the electromagnetic actuator in an embodiment 2 according to the present invention.

FIG. 3 is an exciting circuit diagram of the electromagnetic actuator in an embodiment 2 according to the present invention, and the similar configuration of the electromagnetic actuator to that of the embodiment 1 as shown in FIG. 1 is adopted. Namely, in the exciting current circuit diagram of the electromagnetic actuator in the embodiment 2, the control coils 48 respectively corresponding to the electromagnetic driving element 20A and 20B are connected in parallel between the output terminal 63 of the switching circuit 60 and the output terminal 73 of the switching circuit 70. And the control coils 48 are associatively controlled similarly as in the embodiment 1 shown in FIG. 2 wherein the electromagnetic force F2 with opposite polarity is given respectively to the electromagnetic driving element 20A and 20B.

As the control coils 48 of the electromagnetic driving element 20A and 20B of the exciting circuit diagram in FIG. 3 are connected in parallel each other, the more exciting current than that of FIG. 2 is able to flow through the control coil 48 leading to increase the strength of the electromagnetic driving force if the same source voltage is applied to the positive terminal E1 and the negative terminal E2. Moreover, for example, even when one control coil 48 breaks down, the other control coil 48 solely can drive the reflecting mirror 10 by procuring its exciting current.

Embodiment 3

Figure 4:
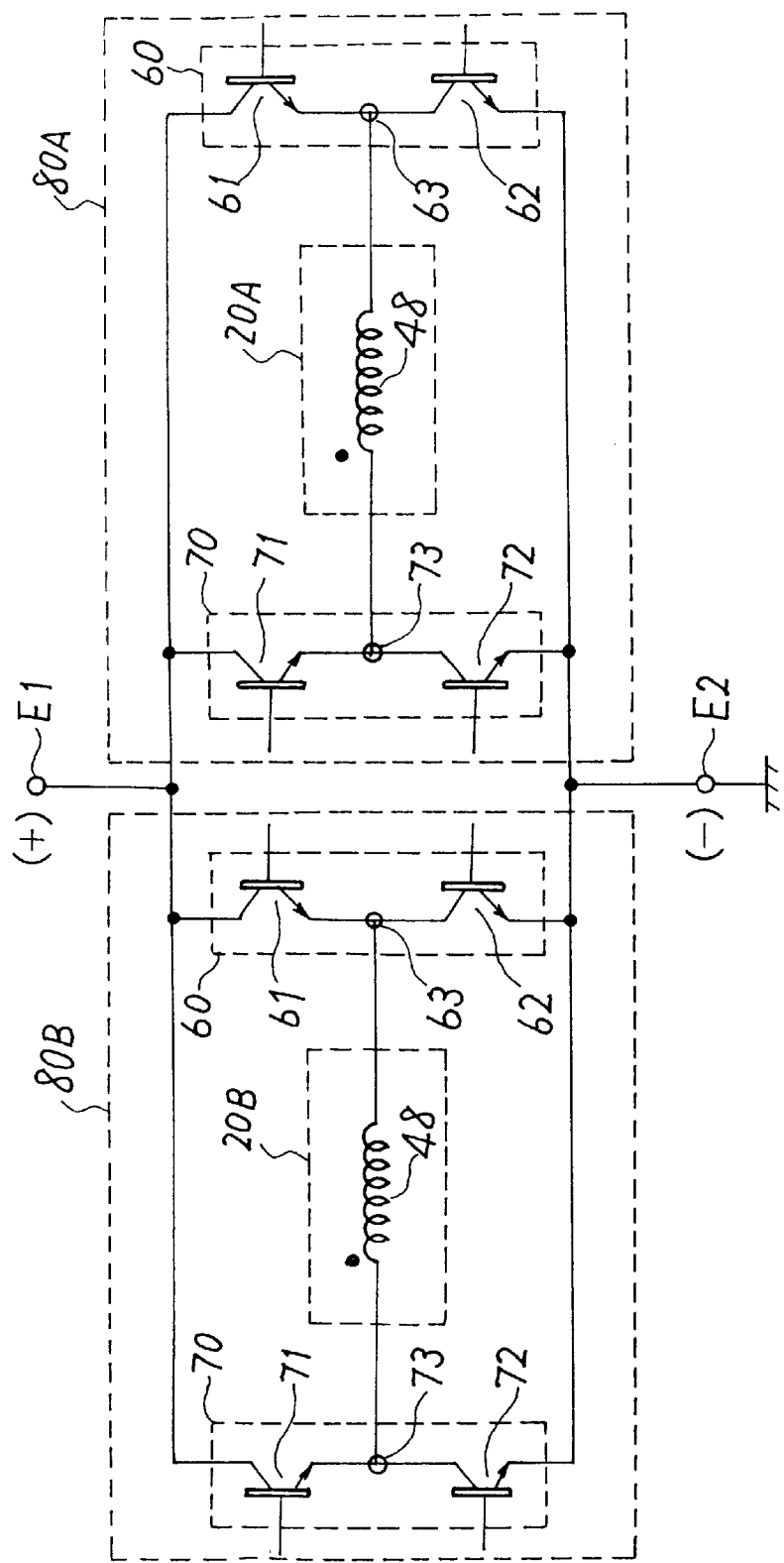
FIG. 4 is an exciting circuit diagram of the electromagnetic actuator in an embodiment 3 according to the present invention.

FIG. 4 is an exciting circuit diagram of the electromagnetic actuator in an embodiment 3 according to the present invention. In the embodiment 3, the control coils 48 of the electromagnetic driving element 20A and 20B are independently excited by an exciting circuit 80A and 80B. The control coil 48 corresponding to the electromagnetic driving element 20A and the control coil 48 corresponding to the electromagnetic driving element 20B are respectively excited by the exciting circuit 80A and 80B, wherein the exciting circuit 80A and 80B are connected in parallel each other between the positive terminal E1 and the negative terminal E2, and the exciting circuit 80A and 80B consist respectively of a pair of the switching circuit 60 and 70 in the same way as shown in FIG. 2 and FIG. 3. To add, the similar configuration of the electromagnetic actuator with that shown in FIG. 1 is also adopted in the embodiment 3.

The control coil 48 of the electromagnetic driving element 20A is connected between the output terminal 63 of the switching circuit 60 and the output terminal 73 of the switching circuit 70 of an exciting circuit 80A, and the control coil 48 of the electromagnetic driving element 20B is connected between the output terminal 63 of the switching circuit 60 and the output terminal 73 of the switching circuit 70 of an exciting circuit 80B. In an exciting circuit shown in FIG. 4, the control coils 48 of the electromagnetic driving element 20A and 20B are able to be excited by the exciting current with the independent direction and magnitude for giving to the reflecting mirror, and, therefore, the independent electromagnetic force is possible to be given to the reflecting mirror 10.

In the exciting circuit shown in FIG. 4, for example, when both repulsive forces given to the reflecting mirror 10 from the electromagnetic driving element 20A and 20B are made small as well as approximately equal in their strength, a resonant frequency of a mechanical driving system for the reflecting mirror 10 can be minimized, and the reflecting mirror 10 is easily driven by a small difference of the electromagnetic forces. In this case, the resonant frequency can be made larger if the repulsive forces for giving to the reflecting mirror 10 are enlarged with keeping their approximate equality as mentioned above.

Embodiment 4

Figure 5:
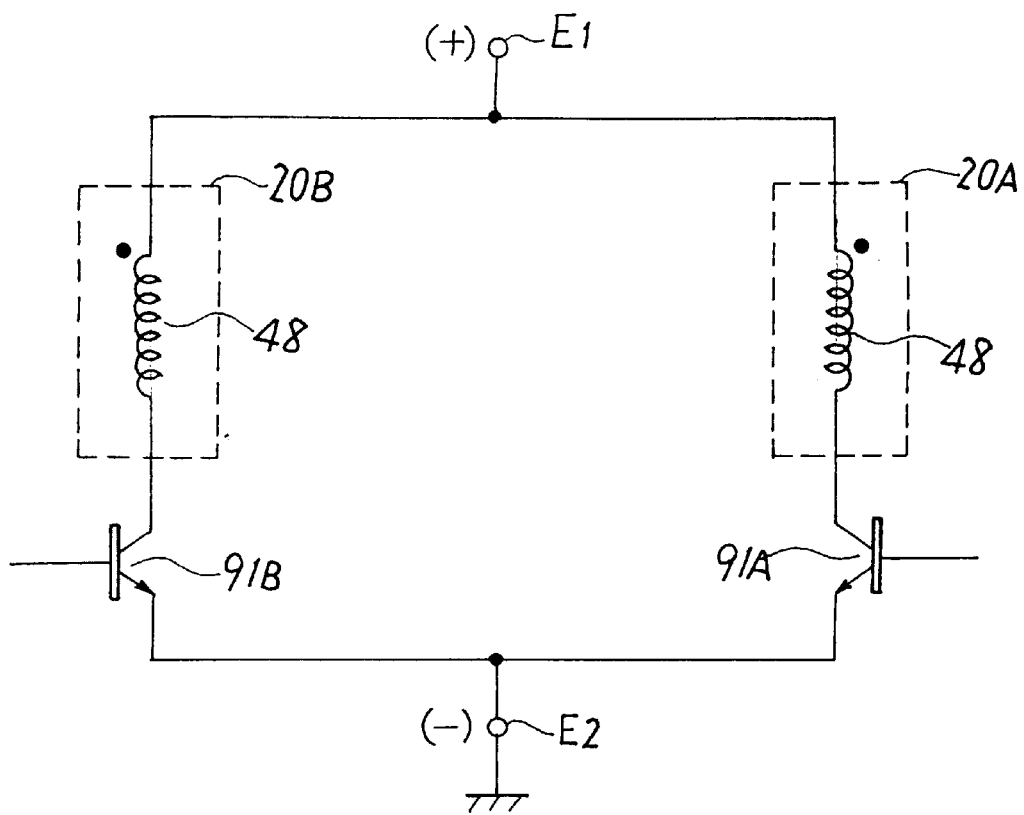
FIG. 5 is an exciting circuit diagram of the electromagnetic actuator in an embodiment 4 according to the present invention.

FIG. 5 is an exciting circuit diagram of the electromagnetic actuator in an embodiment 4 according to the present invention. The configuration of the electromagnetic actuator shown in FIG. 1 is also adopted in the embodiment 4. In this exciting circuit, each of the control coils 48 of the electromagnetic driving element 20A and 20B is independently excited by a power transistor 91A and 91B. The exciting circuit in FIG. 5 is simplest in its configuration wherein the magnitude of the exciting current through each of the control coils 48 is controlled by changing an ON time ratio, but the direction of the exciting current is unable to be changed.

However, the totalized electromagnetic force with the same polarity is obtained when a polarity by the exciting current of the electromagnetic driving element 20A and 20B is made identical. For example, both of the electromagnetic forces of the electromagnetic driving element 20A and 20B can be repulsive or attractive. Furthermore, when the polarity by the exciting current is made opposite to each other between these two driving elements 20A and 20B, it is possible to be configured wherein one driving element delivers the repulsive force and the other driving element delivers the attractive force.

Embodiment 5

The following explanation is made as an embodiment 5 according to the present invention. Although the driven member 10 (the reflecting mirror) is commonly driven by a pair of the electromagnetic actuator 20A and 20B in FIG. 1 shown as the embodiment 1, a number of the electromagnetic driving element may be modified wherein at least one electromagnetic driving element is installed for driving one driven member 10. For example, the driven member 10 can be driven by anyone of the electromagnetic driving element 20A and 20B in FIG. 1. Furthermore, four electromagnetic driving elements are possible to be installed for driving a driven member 10. For example, although the electromagnetic driving element 20A and 20B are installed on both sides of a left and a right of the driven member 10 wherein the driven member 10 is supported free of rotation centering the rotating axis 13 in FIG. 1, four electromagnetic driving elements instead of two are applicable. Namely, the driven member 10 is supported free of sway in any directions by a ball bearing at the supporting point 11, and a total of four electromagnetic driving elements are installed on both sides of the two rectangular axes passing the supporting point 11 for the driven member 10 to be moved in a wider range. In this case, it is of course that each of four electromagnetic driving elements is to be configured similarly with the electromagnetic driving element 20A and 20B in FIG. 1.

Embodiment 6

Figure 6:
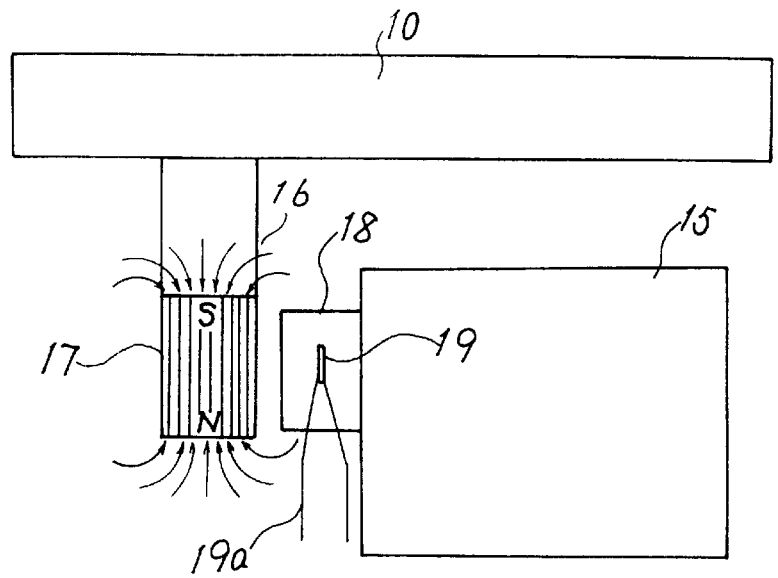
FIG. 6 is a zoomed up configuration of a position sensor of the electromagnetic actuator in an embodiment 6 according to the present invention.
Figure 7:
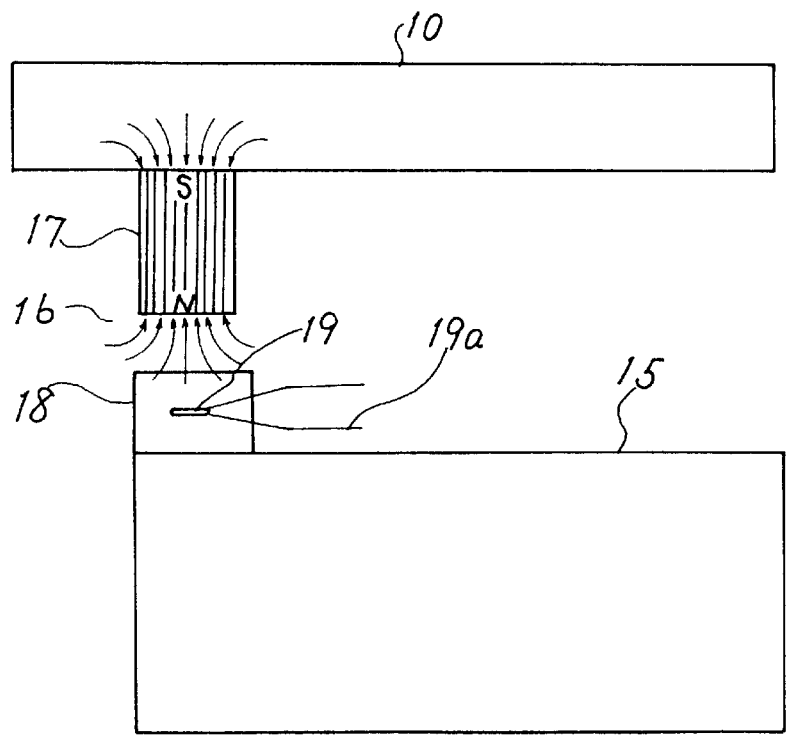
FIG. 7 is a zoomed up configuration of another position sensor of the electromagnetic actuator in an embodiment 6 according to the present invention.
Figure 8:
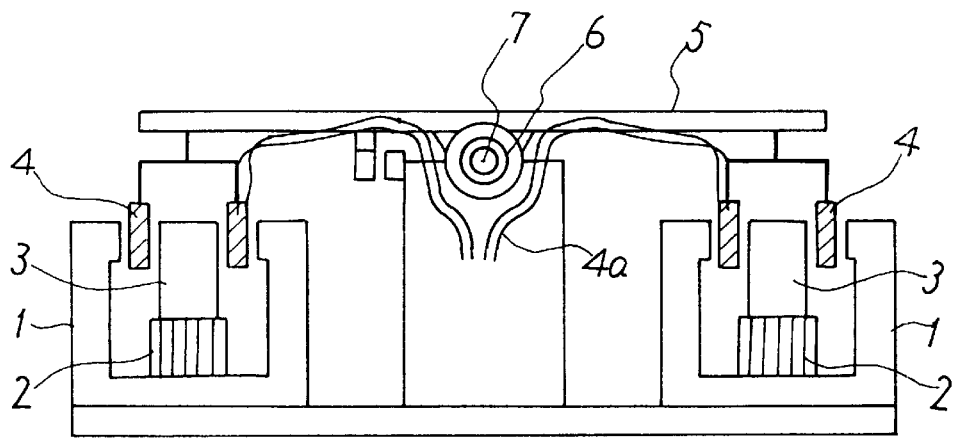
FIG. 8 is a cross section of one electromagnetic actuator in the prior art.
Figure 9:
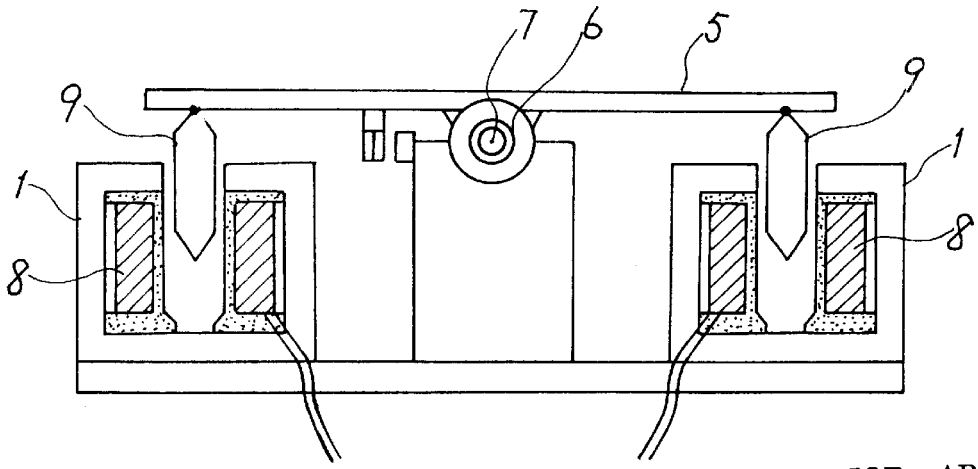
FIG. 9 is a cross section of the other electromagnetic actuator in the prior art.

FIGS. 6 and FIG. 7 show a configuration of the electromagnetic actuator in an embodiment 6 according to the present invention, and a more detailed configuration of a position sensor 16 is disclosed. The position sensor 16 comprises a sensing magnet 17 fixed to the reflecting mirror 10 and a magnetic sensor 18 fixed to the support 15 adjacent to the sensing magnet 17. The sensing magnet has a N pole and a S pole on both ends, and the magnetic sensor 18 is, for example, a sensor chip such as a hole effect element. The FIG. 6 shows a materialized configuration of the position sensor 16 as an example, and FIG. 7 shows the other example. As shown in FIG. 6, a linearity of an output signal from the magnetic sensor 18 along a movable direction of the reflecting mirror 10 is promoted when the magnetic sensor 18 is installed near the sensing magnet 17, and, here, the magnetic sensor 18 is also possible to be fixed near one of the magnetic poles of the sensing magnet 17. Additionally, the position sensor 16 could be a photo position sensor using a light beam. A component marked 19a is a lead wire for the hole effect element 19.

What is claimed is:

1. An electromagnetic actuator including a driven member, a base plate opposing said driven member and an electromagnetic driving element for driving said driven member, said electromagnetic driving element comprises a movable component and a fixed component always opposing said movable component, said movable component is disposed on said driven member and includes a movable magnet with a first magnetic pole of a first magnetic polarity and a second magnetic pole of a second magnetic polarity, said fixed component is disposed on said base plate and includes a fixed magnet with a first magnetic pole of the first magnetic polarity and a second magnetic pole of the second magnetic polarity arranged such that the first magnetic pole of said fixed magnet always opposes the first magnetic pole of said movable magnet so as to impart a magnetic repulsive force to said movable magnet, said fixed component also includes a control coil for generating an electromagnetic controlling force according to an exciting current flowing therein, said control coil being arranged between the first magnetic pole of said fixed magnet and the first magnetic pole of said movable magnet, wherein said movable component is driven by the sum of said magnetic repulsive force and said electromagnetic controlling force at a direction in which said movable component is opposing to said fixed component and said driven member is driven by said movable component.

2. The electromagnetic actuator claimed in claim 1, wherein said control coil is arranged between the first magnetic pole of said fixed magnet and the first magnetic pole of said movable magnet, spaced from both the first magnetic poles of said fixed magnet and said movable magnet.

3. The electromagnetic actuator claimed in claim 1, wherein the base plate is composed of a magnetic material and the second magnetic pole of said fixed component is attached to the base plate.

4. The electromagnetic actuator claimed in claim 1, wherein said control coil is turned about a center line between the first magnetic pole of said fixed magnet and the first magnetic pole of said movable magnet.

5. The electromagnetic actuator claimed in claim 1, wherein a control core is arranged between the first magnetic poles of said fixed magnet and said movable magnet, and said control coil is turned about said control core.

6. The electromagnetic actuator claimed in claim 5, wherein one end of said control core is arranged opposing the first magnetic pole of said movable magnet through a first gap, and a second gap is formed between the opposite end of said control core and the first magnetic pole of said fixed magnet.

7. The electromagnetic actuator claimed in claim 1, wherein said electromagnetic controlling force is changed to change said summed magnetic force according to at least a change in a magnitude, of said exciting current through said control coil.

8. The electromagnetic actuator claimed in claim 1, wherein said exciting current of said control coil is changed in magnitude and direction for changing said electromagnetic controlling force in magnitude and direction, to change said summed magnetic force.

9. The electromagnetic actuator claimed in claim 8, wherein said summed magnetic force, according to the change in the magnitude and direction of said exciting current of said control coil, is adjusted within a range for said magnetic repulsive force being given from said fixed component to said movable component.

10. The electromagnetic actuator claimed in claim 8, wherein said summed magnetic force is changed according to the change in the magnitude and direction of said exciting current of said control coil, from a state where said fixed component repels said movable magnet to a state where fixed component attracts said movable magnet.

11. An electromagnetic actuator comprising:

a driven member installed free of sway centering a supporting point, a base plate opposing to said driven member, a first electromagnetic driving element installed between one end of said driven member to the supporting point and said base plate for driving said driven member, and a second electromagnetic driving element installed between the other end of said driven member to the supporting point and said base plate for driving said driven member, said first electromagnetic driving element and said second electromagnetic driving element respectively includes a movable component and a fixed component always opposing to its corresponding movable component, each movable component has a movable magnet disposed on said driven member with a first magnetic pole of a first magnetic polarity and a second magnetic pole of a second magnetic polarity, each fixed component has a fixed magnet disposed on said base plate with a first magnetic pole of the first magnetic polarity and a second magnetic pole of the second magnetic polarity arranged such that the first magnetic pole of said fixed magnet always opposes to the first magnetic pole of its corresponding movable magnet so as to impart a magnetic repulsive force to its corresponding movable magnet, and each fixed component also has a control coil for generating an electromagnetic controlling force according to an exciting current flowing therein, said each control coil being arranged between the first magnetic pole of said fixed magnet and the first magnetic pole of its corresponding movable magnet, wherein each movable magnet of said first and second electromagnetic elements is controlled by the sum of said magnetic repulsive force and said electromagnetic controlling force at a direction in which each movable component is opposing to its corresponding fixed component and said driven member is driven by said each movable component.

12. The electromagnetic actuator claimed in claim 11, wherein said control coils of said first electromagnetic driving element and said second electromagnetic driving element are associatively controlled.

13. The electromagnetic actuator claimed in claim 11, wherein when said first electromagnetic driving element is controlled by its control coil to increase its magnetic repulsive force to its corresponding movable magnet, said second electromagnetic driving element is controlled by its control coil to decrease its magnetic repulsive force to its corresponding movable magnet.

14. The electromagnetic actuator claimed in claim 11, wherein when said first electromagnetic driving element is controlled by its control coil so as to increase its magnetic repulsive force to its corresponding movable magnet, said second electromagnetic driving element is controlled by its control coil so as to decrease its magnetic repulsive force and generate an magnetic attractive force to its corresponding movable magnet.

15. The electromagnetic actuator claimed in claim 11, wherein said control coils of said first electromagnetic driving element and said second electromagnetic driving element are independently controlled.

* * * * *